United States Patent
Weder

[11] Patent Number: 6,088,961
[45] Date of Patent: *Jul. 18, 2000

[54] COVERING FOR FLOWER POT AND FLORAL GROUPING

[75] Inventor: Donald E. Weder, Highland, Ill.

[73] Assignee: Southpac Trust Int'l, Inc.

[*] Notice: This patent is subject to a terminal disclaimer.

[21] Appl. No.: 09/325,238

[22] Filed: Jun. 3, 1999

Related U.S. Application Data

[63] Continuation of application No. 09/021,215, Feb. 10, 1998, which is a continuation of application No. 08/971,206, Nov. 14, 1997, which is a continuation of application No. 08/526,335, Sep. 11, 1995, Pat. No. 5,699,648, which is a continuation of application No. 08/183,010, Jan. 14, 1994, Pat. No. 5,479,758, which is a continuation of application No. 08/001,001, Jan. 6, 1993, Pat. No. 5,307,606.

[51] Int. Cl.[7] ........................................ A01G 9/02
[52] U.S. Cl. ......................................... 47/72
[58] Field of Search .............. 47/66.3, 72, 84; 229/4.5, 89, 90

[56] References Cited

U.S. PATENT DOCUMENTS

| Re. 21,065 | 5/1939 | Copeman | 93/2 |
| D. 259,333 | 5/1981 | Charbonneau | D9/306 |

(List continued on next page.)

FOREIGN PATENT DOCUMENTS

| 4231978 | 6/1979 | Australia . |
| 654427 | 1/1965 | Belgium . |
| 0050990 | 5/1982 | European Pat. Off. . |
| 0791543 | 8/1997 | European Pat. Off. . |
| 1376047 | 9/1964 | France . |
| 2036163 | 12/1970 | France . |
| 2137325 | 12/1972 | France . |
| 2272914 | 12/1975 | France . |
| 2489126 | 3/1982 | France . |
| 2610604 | 8/1988 | France . |
| 2603159 | 3/1989 | France . |
| 2619698 | 3/1989 | France . |
| 345464 | 12/1921 | Germany . |
| 513971 | 11/1930 | Germany . |
| 1166692 | 3/1964 | Germany . |
| 1962947 | 6/1971 | Germany . |
| 2060812 | 11/1971 | Germany . |
| 2748626 | 5/1979 | Germany . |
| 3445799 | 6/1986 | Germany . |
| 3829281 | 5/1989 | Germany . |
| 3911847 | 10/1990 | Germany . |
| 224507 | 4/1996 | Italy . |
| 542958 | 2/1993 | Japan . |
| 8301709 | 12/1984 | Netherlands . |
| 1000658 | 1/1996 | Netherlands . |
| 560532 | 4/1975 | Switzerland . |
| 5605 | 5/1885 | United Kingdom . |
| 1204647 | 9/1970 | United Kingdom . |
| 2056410 | 3/1981 | United Kingdom . |
| 2074542 | 11/1981 | United Kingdom . |
| 2128083 | 4/1984 | United Kingdom . |
| 2252708 | 8/1992 | United Kingdom . |
| 9315979 | 8/1993 | WIPO . |

OTHER PUBLICATIONS

Speed Cover Brochure, "The Simple Solution For Those Peak Volume Periods", Highland Supply Corporation, ©1989.

"Speed Sheets and Speed Rolls" Brochure, Highland Supply Corporation, ©1990.

"Color Them Happy with Highlander Products" ©1992.

(List continued on next page.)

*Primary Examiner*—Peter M. Poon
*Assistant Examiner*—Elizabeth Shaw
*Attorney, Agent, or Firm*—Dunlap, Codding & Rogers, PC

[57] ABSTRACT

A cover for use with a flower pot having a floral grouping disposed therein. The cover includes a sheet of material having a sheet extension connected to an outer peripheral surface thereof. The sheet of material is formed into a pot cover for covering the flower pot and the sheet extension extends over the floral grouping.

12 Claims, 2 Drawing Sheets

U.S. PATENT DOCUMENTS

| | | | |
|---|---|---|---|
| D. 279,279 | 6/1985 | Wagner | D11/143 |
| D. 301,991 | 7/1989 | Van Sant | D11/149 |
| D. 335,105 | 4/1993 | Ottenwalder et al. | D11/164 |
| D. 368,025 | 3/1996 | Sekerak et al. | D9/305 |
| 524,219 | 8/1894 | Schmidt . | |
| 732,889 | 7/1903 | Paver . | |
| 950,785 | 3/1910 | Pene . | |
| 1,063,154 | 5/1913 | Bergen . | |
| 1,446,563 | 2/1923 | Hughes . | |
| 1,520,647 | 12/1924 | Hennigan . | |
| 1,525,015 | 2/1925 | Weeks . | |
| 1,610,652 | 12/1926 | Bouchard . | |
| 1,697,751 | 1/1929 | Blake | 229/87 |
| 1,863,216 | 6/1932 | Wordingham . | |
| 1,978,631 | 10/1934 | Herrlinger | 91/68 |
| 2,048,123 | 7/1936 | Howard | 229/87 |
| 2,170,147 | 8/1939 | Lane | 206/56 |
| 2,200,111 | 5/1940 | Bensel | 229/1.5 |
| 2,278,673 | 4/1942 | Savada et al. | 154/43 |
| 2,302,259 | 11/1942 | Rothfuss | 41/10 |
| 2,323,287 | 7/1943 | Amberg | 229/53 |
| 2,355,559 | 8/1944 | Renner | 229/8 |
| 2,371,985 | 3/1945 | Freiberg | 206/46 |
| 2,411,328 | 11/1946 | MacNab | 33/12 |
| 2,510,120 | 6/1950 | Leander | 117/122 |
| 2,529,060 | 11/1950 | Trillich | 117/68.5 |
| 2,621,142 | 12/1952 | Wetherell | 154/117 |
| 2,648,487 | 8/1953 | Linda | 229/55 |
| 2,688,354 | 9/1954 | Berger | 150/28 |
| 2,774,187 | 12/1956 | Smithers | 47/41 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 2,989,828 | 6/1961 | Warp | 53/390 |
| 3,022,605 | 2/1962 | Reynolds | 47/37 |
| 3,080,680 | 3/1963 | Reynolds | 47/37 |
| 3,094,810 | 6/1963 | Kalpin | 47/37 |
| 3,121,647 | 2/1964 | Harris et al. | 118/202 |
| 3,130,113 | 4/1964 | Silman | 161/97 |
| 3,271,922 | 9/1966 | Wallerstein et al. | 53/3 |
| 3,322,325 | 5/1967 | Bush | 229/62 |
| 3,376,666 | 4/1968 | Leonard | 47/41 |
| 3,380,646 | 4/1968 | Doyen et al. | 229/57 |
| 3,431,706 | 3/1969 | Stuck | 53/390 |
| 3,508,372 | 4/1970 | Wallerstein et al. | 53/3 |
| 3,510,054 | 5/1970 | Sanni et al. | 229/66 |
| 3,512,700 | 5/1970 | Evans et al. | 229/53 |
| 3,552,059 | 1/1971 | Moore | 47/41.12 |
| 3,554,434 | 1/1971 | Anderson | 229/55 |
| 3,556,389 | 1/1971 | Gregoire | 229/53 |
| 3,557,516 | 1/1971 | Brandt | 53/14 |
| 3,620,366 | 11/1971 | Parkinson | 206/59 |
| 3,681,105 | 8/1972 | Milutin | 117/15 |
| 3,767,104 | 10/1973 | Bachman et al. | 229/7 |
| 3,793,799 | 2/1974 | Howe | 53/32 |
| 3,869,828 | 3/1975 | Matsumoto | 47/34.11 |
| 3,888,443 | 6/1975 | Flanigen | 248/152 |
| 3,962,503 | 6/1976 | Crawford | 428/40 |
| 4,043,077 | 8/1977 | Stonehocker | 47/66 |
| 4,054,697 | 10/1977 | Reed et al. | 428/40 |
| 4,091,925 | 5/1978 | Griffo et al. | 206/423 |
| 4,113,100 | 9/1978 | Soja et al. | 206/602 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,248,347 | 2/1981 | Trimbee | 206/423 |
| 4,265,049 | 5/1981 | Gorewitz | 47/26 |
| 4,280,314 | 7/1981 | Stuck | 53/241 |
| 4,297,811 | 11/1981 | Weder | 47/72 |
| 4,333,267 | 6/1982 | Witte | 47/84 |
| 4,347,686 | 9/1982 | Wood | 47/73 |
| 4,380,564 | 4/1983 | Cancio et al. | 428/167 |
| 4,400,910 | 8/1983 | Koudstall et al. | 47/84 |
| 4,413,725 | 11/1983 | Bruno et al. | 206/45.33 |
| 4,546,875 | 10/1985 | Zweber | 206/0.82 |
| 4,621,733 | 11/1986 | Harris | 206/423 |
| 4,640,079 | 2/1987 | Stuck | 53/390 |
| 4,717,262 | 1/1988 | Roen et al. | 383/120 |
| 4,733,521 | 3/1988 | Weder et al. | 53/580 |
| 4,765,464 | 8/1988 | Ristvedt | 206/0.82 |
| 4,771,573 | 9/1988 | Stengel | 47/67 |
| 4,773,182 | 9/1988 | Weder et al. | 47/72 |
| 4,801,014 | 1/1989 | Meadows | 206/423 |
| 4,810,109 | 3/1989 | Castel | 383/105 |
| 4,835,834 | 6/1989 | Weder | 29/525 |
| 4,941,572 | 7/1990 | Harris | 206/423 |
| 4,980,209 | 12/1990 | Hill | 428/34.1 |
| 5,073,161 | 12/1991 | Weder et al. | 493/154 |
| 5,074,675 | 12/1991 | Osgood | 383/122 |
| 5,105,599 | 4/1992 | Weder | 53/399 |
| 5,111,638 | 5/1992 | Weder | 53/397 |
| 5,120,382 | 6/1992 | Weder | 156/212 |
| 5,152,100 | 10/1992 | Weder et al. | 47/72 |
| 5,181,364 | 1/1993 | Weder | 53/397 |
| 5,199,242 | 4/1993 | Weder et al. | 53/397 |
| 5,205,108 | 4/1993 | Weder et al. | 53/397 |
| 5,228,234 | 7/1993 | de Klerk et al. | 47/41.01 |
| 5,235,782 | 8/1993 | Landau | 47/72 |
| 5,239,775 | 8/1993 | Landau | 47/72 |
| 5,249,407 | 10/1993 | Stuck | 53/399 |
| 5,259,106 | 11/1993 | Weder et al. | 29/469.5 |
| 5,307,606 | 5/1994 | Weder | 53/410 |
| 5,315,785 | 5/1994 | Avôt et al. | 47/72 |
| 5,350,240 | 9/1994 | Billman et al. | 383/104 |
| 5,353,575 | 10/1994 | Stepanek | 53/461 |
| 5,361,482 | 11/1994 | Weder et al. | 29/469 |
| 5,388,695 | 2/1995 | Gilbert | 206/423 |
| 5,443,670 | 8/1995 | Landau | 156/191 |
| 5,493,809 | 2/1996 | Weder et al. | 47/72 |
| 5,496,251 | 3/1996 | Cheng | 493/224 |
| 5,496,252 | 3/1996 | Gilbert | 493/224 |
| 5,526,932 | 6/1996 | Weder | 206/423 |
| 5,572,851 | 11/1996 | Weder | 53/399 |
| 5,575,133 | 11/1996 | Weder et al. | 53/397 |
| 5,617,703 | 4/1997 | Weder | 53/413 |
| 5,624,320 | 4/1997 | Martinez | 472/51 |
| 5,647,168 | 7/1997 | Gilbert | 47/72 |

OTHER PUBLICATIONS

"Costa Keeps the Christman Spirit", Supermarket Floral, Sep. 15, 1992.

"Super Seller", Supermarket Floral, Sep. 15, 1992.

"Halloween", Link Magazine, Sep. 1992, 2 pages.

"Now More Than Ever", Supermarket Floral, Sep. 15, 1992.

Le Plant Sac Advertisement, published prior to Sep. 26, 1987.

"A World Cut Flower and Pot Plant Packaging" Brochure, Klerk's Plastic Products Manufacturing, Inc., published prior to Mar. 31, 1994, 6 pages.

Chantler & Chantler brochure showing Zipper Sleeve™ and Florasheet®, published prior to Mar. 31, 1994, 2 pages.

"Foil Jackets" brochure, Custom Medallion, Inc., Dec., 1996, 2 pages.

"Derwent Abstract" of FR 2610604A. It is noted that the abstract is an incorrect English translation of the contents of the Franch patent. The French patent does not enable or disclose adhesively attaching the covering to the container. 1988.

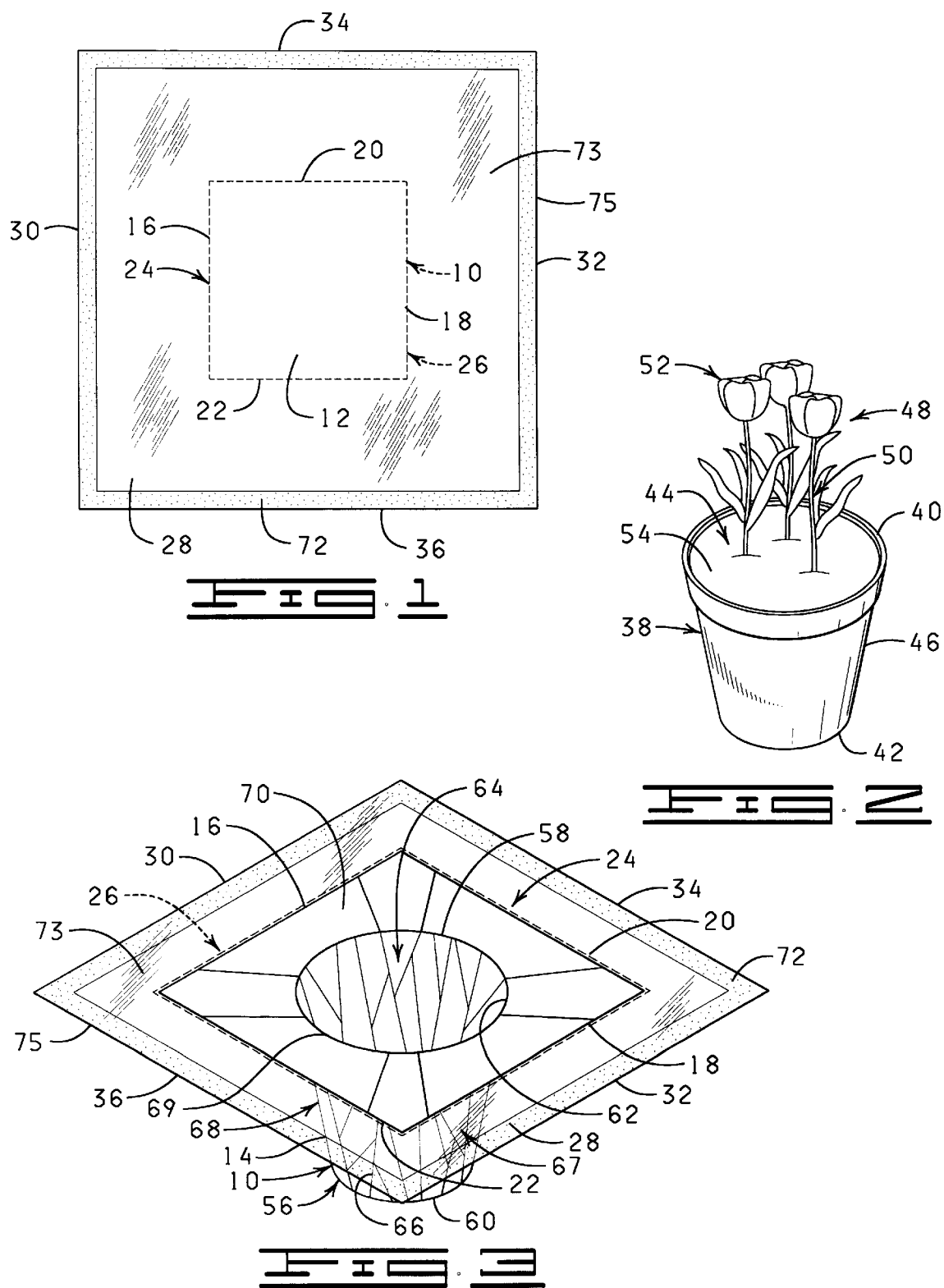

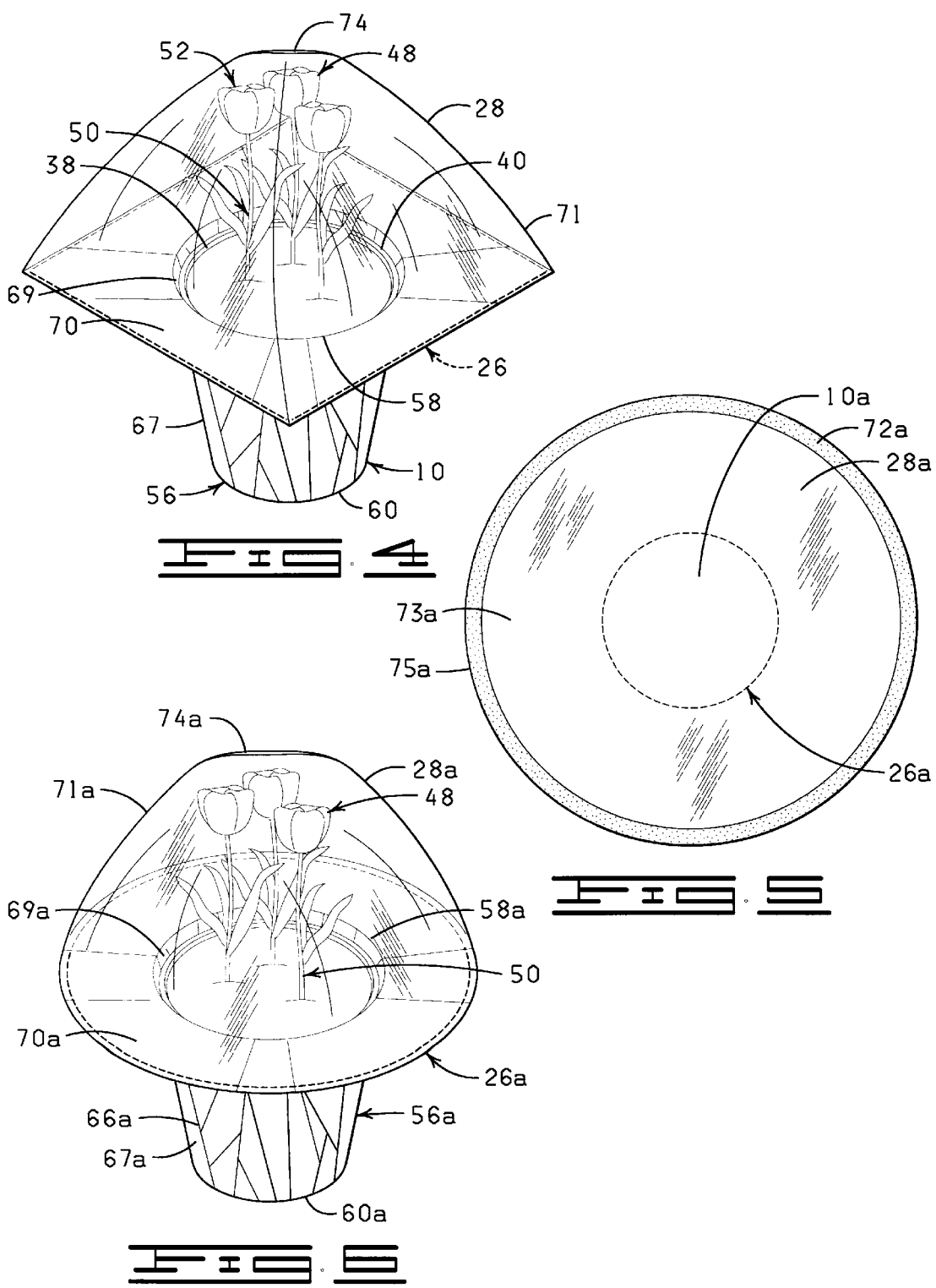

COVERING FOR FLOWER POT AND FLORAL GROUPING

This application is a continuation of copending U.S. Ser. No. 09/021,215, filed Feb. 10, 1998, entitled "COVERING FOR FLOWER POT AND FLORAL GROUPING", which is a continuation of copending application U.S. Ser. No. 08/971,206, filed Nov. 14, 1997, entitled "COVERING FOR FLOWER POT AND FLORAL GROUPING", which is a continuation of U.S. Ser. No. 08/526,335, filed Sep. 11, 1995, entitled "COVERING FOR FLOWER POT AND FLORAL GROUPING", now U.S. Pat. No. 5,699,648, issued Dec. 23, 1997, which is a continuation of U.S. Ser. No. 08/183,010, filed Jan. 14, 1994, entitled "COVERING FOR FLOWER POT AND FLORAL GROUPING", now U.S. Pat. No. 5,479,758, issued Jan. 2, 1996, which is a continuation of U.S. Ser. No. 08/001,001, filed Jan. 6, 1993, entitled "COVERING FOR FLOWER POT AND FLORAL GROUPING", now U.S. Pat. No. 5,307,606, issued May 3, 1994.

FIELD OF THE INVENTION

The present invention relates generally to coverings for flower pots and, more particularly, but not by way of limitation, to a covering for a flower pot having a sheet extension for extending about a floral grouping disposed in the flower pot.

BRIEF DESCRIPTION OF THE DRAWINGS

FIG. 1 is a plan view of a sheet of material with a sheet extension connected thereto constructed in accordance with the present invention.

FIG. 2 is a partial perspective view of a flower pot having a floral grouping disposed therein.

FIG. 3 is a partial perspective view of the sheet of material formed into a pot cover with the sheet extension connected thereto.

FIG. 4 is a partial perspective view showing the flower pot of FIG. 2 disposed in the pot cover of FIG. 3 with the sheet extension formed about the floral grouping.

FIG. 5 is plan view of a modified sheet of material with a modified sheet extension connected thereto.

FIG. 6 is a partial perspective view of the sheet of material of FIG. 5 formed into the pot cover and having the flower pot of FIG. 2 disposed in the pot cover with the sheet extension formed about the floral grouping.

DESCRIPTION OF THE PREFERRED EMBODIMENTS

Referring to FIG. 1, as shown therein and designated by the general reference numeral 10 is a sheet of material constructed in accordance with the present invention. The sheet of material 10 shown in FIG. 1 has an upper surface 12, a lower surface 14 (FIG. 3), a first end 16, a second end 18, a first side 20 and a second side 22. The ends 16 and 18 cooperate with the sides 20 and 22 to define an outer peripheral surface 24 of the sheet of material 10. The outer peripheral surface 24 of the sheet of material 10 is defined by perforations 26, as shown in FIGS. 1, 3 and 4.

As shown in FIGS. 1, 3 and 4, a sheet extension 28 is connected to the outer peripheral surface 24 of the sheet of material 10. As shown in FIGS. 1 and 3, the sheet extension 28 extends a distance outwardly from the outer peripheral surface 24 of the sheet of material 10. The sheet extension 28 has a first end 30, a second end 32, a first side 34 and a second side 36. A portion of the sheet extension 28 extends a distance outwardly from the first end 16 of the sheet of material 10 terminating with the first end 30 of the sheet extension 28. Another portion of the sheet extension 28 extends a distance outwardly from the second end 18 of the sheet of material 10 terminating with the second end 32 of the sheet extension 28. Yet another portion of the sheet extension 28 extends a distance outwardly from the first side 20 of the sheet of material 10 terminating with the first side 34 of the sheet extension 28. Still another portion of the sheet extension 28 extends a distance outwardly from the second side 22 of the sheet of material 10 terminating with the second side 36 of the sheet extension 28.

The sheet extension 28 cooperates with the sheet of material 10 to define a generally square or rectangularly shaped sheet with the perforations 26 being disposed in a central portion of the sheet and defining the outer peripheral surface 24 of the sheet of material 10. Preferably, the sheet of material 10 and the sheet extension 28 are unitary and formed from a single sheet or plies or multiple sheets one on top of the other which may or may not be laminated.

The sheet of material 10 and the sheet extension 28 are constructed from any suitable flexible material that is capable of being wrapped about a floral grouping and formed into the covering, as described herein. Preferably, the sheet of material 10 and the sheet extension 28 are constructed of a material selected from a group of materials consisting of paper, metal foil, cloth (natural or synthetic), denim, burlap or polymer film or combinations thereof.

The term "polymer film" as used herein means any polymer film. For example, but not by way of limitation, one polymer film is a polypropylene film. Another example of a polymer film, but not by way of limitation, is cellophane.

The sheet of material 10 and the sheet extension 28 have a thickness in a range from about 0.1 mils to about 30 mils. Preferably, the sheet of material 10 and the sheet extension 28 have a thickness in a range from about 0.1 mils to about 5 mils.

The sheet of material 10 and the sheet extension 28 may be any shape and a rectangular shape is shown in FIG. 1 only by way of example. The sheet of material 10 and the sheet extension 28 for example only may be square, rectangular, circular or any other geometric shape such as heart shaped for example only.

The sheet of material 10 and the sheet extension 28 may be constructed of a single layer of material or a plurality of layers of the same or different types of materials. Any thickness of the sheet of material 10 and the sheet extension 28 may be utilized in accordance with the present invention as long as the sheet of material 10 and the sheet extension 28 is wrappable about a floral grouping and formable into the covering, as described herein. The layers of material comprising the sheet of material 10 and the sheet extension 28 may be connected together or laminated or may be separate layers.

The covering of the present invention is particularly constructed to be used with a pot 38 (FIG. 2). The pot 38 has a top 40, a bottom 42 with an opening through the top 40 forming a receiving space 44 within the pot 38. The pot 38 also has an outer peripheral surface 46. As shown in FIG. 2, the pot 38 is generally cylindrically shaped. However, the pot 38 may be any shaped as may be desired in a particular application.

A floral grouping 48 is disposed at least partially within the receiving space of the pot 38, as shown in FIG. 2. The floral grouping 48 has a stemmed end 50 and a bloom end 52. In one embodiment as shown in FIG. 2, material such as soil 54 is disposed in the receiving space 44 and a portion of the stem end 50 extends into the soil 54. The floral grouping extends a distance upwardly from the top 40 of the pot 38 terminating with the bloom end 52.

"Floral grouping" as used herein means cut fresh flowers, artificial flowers, a single flower, other fresh and/or artificial plants or other floral materials and may include other secondary plants and/or ornamentation which add to the aesthetics of the overall floral grouping.

A decorative pattern, such as a color and/or an embossed pattern, and/or other decorative surface ornamentation may be applied to the upper surface 12 and/or the lower surface 14 of the sheet of material 10 or portions thereof including, but not limited to printed design, coatings, colors, flocking or metallic finishes. The sheet of material 10 also may be totally or partially clear or tinted transparent material. The sheet extension 28 is transparent, although a decorative pattern also may be applied to the sheet extension 28.

The sheet of material 10 with the sheet extension 28 connected thereto is placed between a male and a female die or other forming means and formed into a pot cover 56 (FIG. 3). As shown in FIGS. 3 and 4, the pot cover 56 has a top 58, a closed bottom 60 and a cover opening 62 (FIG. 3) formed through the top 58 and extending through the top 58 a distance toward the bottom 60 of the pot cover 56 providing a pot receiving space 64 (FIG. 3). The pot receiving space 64 is shaped and adapted to receive the pot 38.

The pot cover 56 has a plurality of overlapping folds 66 (FIG. 3) with each of the overlapping folds 66 extending at various distances and at various angles over an outer peripheral surface 68 (FIG. 3) of the pot cover 56 extending between the top 58 and the bottom 60. The overlapping folds 66 extend at various angles and over various distance over the outer peripheral surface 68.

The pot cover 56 includes a skirt 70 (FIGS. 3 and 4). The skirt 70 extends from the top 40 of the pot 38 radially outwardly with an outer peripheral surface of the skirt 70 being formed by the outer peripheral surface 24 of the sheet of material 10. The perforations 26 extend along the outer peripheral surface of the skirt 70 formed by the outer peripheral surface 24 of the sheet of material 10.

The overlapping folds 66 may be connected or at least partially connected. The connection of the overlapping folds may be accomplished by using heat sealing material and heat sealing the overlapping folds or by adhesively or cohesively connecting the overlapping folds.

A pot cover constructed in the manner just described with respect to the pot cover 56 and a system for forming such a pot cover is disclosed in U.S. Pat. No. 4,773,182, entitled, Article Forming System, issued to Weder, et al, Sep. 27, 1988, and the disclosure of this patent specifically hereby is incorporated herein by reference.

The pot 38 is placed in the pot receiving space 64 and positioned in the pot cover 56 such that the bottom 42 of the pot 38 is disposed generally adjacent the bottom 60 of the pot cover 56. The pot cover 56 substantially encompasses the entire outer peripheral surface 46 of the pot 38 including the bottom 42. The pot cover 56 extends from the bottom 42 to the top 40 of the pot 38. The skirt 70 extends radially outwardly from the top 40 of the pot 38.

After the pot 38 has been placed in the pot cover 56, the skirt extension 28 is formed about the floral grouping 48 to a position wherein the sheet extension 28 covers and encompasses a substantial portion of the floral grouping including the bloom end of the floral grouping.

The sheet extension 28 preferably includes a bonding material 72 (FIG. 1) disposed on the upper surface of the sheet extension 28 and extending about the outer peripheral surface of the sheet extension 28. After the sheet extension 28 has been formed about the floral grouping 48, the ends of the sheet of material are bonded together to provide a closed end 74 (FIG. 4).

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the material or sheet of material to effect the connection or bonding described herein. The term "bonding material" also includes labels, bands, ribbons, strings, tape, staples or combinations thereof.

The sheet extension 28 remains in a position extending about the floral grouping 48 until it is desired to remove the sheet extension 28. The sheet extension 28 is removed from the pot cover 56 by tearing along the perforations 26 separating the sheet extension 28 from the pot cover 56. The sheet extension 28 then is removed from the floral grouping 48 leaving the pot cover 56 providing a decorative cover for the pot 38.

In addition to the perforations 26, the sheet extension 28 also may include perforations extending between the perforations 26 and the outer peripheral surface of the sheet extension 28 to further assist in the removal of the sheet extension 28 when it is no longer is desired to keep the sheet extension 28 extending about the floral grouping 48.

Embodiment of FIGS. 5 and 6

Shown in FIGS. 5 and 6 is a sheet of material 10a having a sheet extension 28a connected thereto. The sheet of material 10a and the sheet extension 28a are constructed exactly like the sheet of material 10 and the sheet extension 28 shown in FIGS. 1, 3 and 4 and described in detail before, except the sheet of material 10a is circularly shaped having a circularly shaped outer peripheral surface 24a and the sheet extension 28a is circularly shaped having a circularly shaped outer peripheral surface.

The sheet of material 10a is formed into a pot cover 56a (FIG. 6) in a manner exactly like that described before with respect to the pot cover 56 (Figures, 3 and 4), except the pot cover 56a has a skirt 70 with a circularly shaped appearance and a circularly shaped outer peripheral surface defined by the circularly shaped outer peripheral surface 24a of the sheet of material 10a. The sheet extension 28a extends a distance outwardly from the skirt 70a and also has a circularly shaped outer peripheral surface, as mentioned before.

The sheet extension 28a is formed about the floral grouping 48 in a manner like that described before and secured to provide the closed end 74a.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for providing a covering for use with a pot having a floral grouping disposed therein, the pot having a top, a bottom and an outer peripheral surface, and the floral grouping having a stem end and a bloom end with the floral grouping extending a distance upwardly from the top of the pot and terminating with the bloom end, the method comprising:

provided a sheet of material having an upper surface, a lower surface and an outer perimeter, a sheet extension being connected to the outer perimeter of the sheet of material and the sheet extension extending a distance from the outer perimeter of the sheet of material;

forming the sheet of material into a pot cover having a top, a closed bottom and a cover opening extending through the top a distance toward the closed bottom of the pot cover providing a pot receiving space shaped and adapted to receive the pot, the pot cover having a plurality of overlapping folds and the sheet extension forming an upper sleeve portion extending a distance from the top of the pot cover;

placing the pot in the pot cover with the bottom of the pot being disposed substantially adjacent the closed bottom of the pot cover and the floral grouping extending a distance upwardly from the top of the pot cover; and forming the upper sleeve portion about the floral grouping with the upper sleeve portion covering a substantial portion of the floral grouping including the bloom end of the floral grouping.

2. The method of claim 1 wherein the step of forming the sheet of material into the pot cover is defined further as forming the sheet of material into the pot cover having a base portion having an upper end and a skirt portion connected to the upper end of the base portion and extending a distance outwardly therefrom, the upper sleeve portion formed from the sheet extension extending outwardly from the skirt portion of the pot cover.

3. The method of claim 1 wherein the step of providing the sheet of material with the sheet extension connected thereto is further defined as providing the sheet of material with the sheet extension connected thereto and having perforations extending between the sheet of material and the sheet extension, and wherein the method further comprises:

tearing the sheet of material and the sheet extension along the perforations to remove the sheet extension from the sheet of material leaving the pot cover.

4. A covering for use with a pot having a floral grouping disposed therein, the pot having a top, a bottom and an outer peripheral surface, and the floral grouping having a stem end and a bloom end with the floral grouping extending a distance upwardly from the top of the pot terminating with the bloom end, the covering comprising:

a pot cover having a top, a closed bottom and a cover opening extending through the top a distance toward the closed bottom of the pot cover providing a pot receiving space shaped and adapted to receive the pot, the pot cover having a plurality of overlapping folds, an upper sleeve portion extending a distance from the top of the pot cover a distance outwardly from the top of the pot cover, the pot being disposed in the pot receiving space with the bottom of the pot being disposed substantially adjacent the closed bottom of the pot cover, the upper sleeve portion being formed about the floral grouping with the upper sleeve portion covering a substantial portion of the floral grouping including the bloom end of the floral grouping.

5. The covering of claim 4 further comprising perforations between the pot cover and the upper sleeve portion, the upper sleeve portion being removable from the pot cover by tearing along the perforations.

6. A method for providing a covering comprising:

providing a pot having a floral grouping disposed therein, the pot having a top and a bottom and an outer peripheral surface, and the floral grouping having a stem end and a bloom end with the floral grouping extending a distance upwardly from the top of the pot terminating with the bloom end;

providing a sheet of material having an upper surface, a lower surface and an outer perimeter, a sheet extension being connected to the outer perimeter of the sheet of material and the sheet extension extending a distance from the outer perimeter of the sheet of material;

forming the sheet of material into a pot cover having a top, a closed bottom and a cover opening extending through the top a distance toward the closed bottom of the pot cover providing a pot receiving space shaped and adapted to receive the pot, the pot cover having a plurality of overlapping folds and the sheet extension forming an upper sleeve portion which extends a distance from the top of the pot cover;

placing the pot in the pot cover with the bottom of the pot being disposed substantially adjacent the closed bottom of the pot cover and the floral grouping extending a distance upwardly from the top of the pot cover; and forming the upper sleeve portion about the floral grouping with the upper sleeve portion covering a substantial portion of the floral grouping including the bloom end of the floral grouping.

7. The method of claim 6 wherein the step of forming the sheet of material into the pot cover is defined further as forming the sheet of material into the pot cover having a base portion having an upper end and a skirt portion connected to the upper end of the base portion and extending a distance outwardly therefrom, the upper sleeve portion formed from the sheet extension extending outwardly from the skirt portion of the pot cover.

8. The method of claim 6 wherein the step of providing the sheet of material and the sheet extension is defined further as providing the sheet extension with a bonding material disposed thereon, and wherein the step of forming the upper sleeve portion about the floral grouping is defined further as forming the upper sleeve portion about the floral grouping with the upper sleeve portion covering a substantial portion of the floral grouping including the bloom end of the floral grouping and portions of the upper sleeve portion being connected via the bonding material to provide a closed end of the upper sleeve portion of the pot cover with the closed end being disposed above the bloom end of the floral grouping.

9. A method for providing a covering for use with a pot having a floral grouping disposed therein, the pot having a top, a bottom and an outer peripheral surface, and the floral grouping having a stem end and a bloom end with the floral grouping extending a distance upwardly from the top of the pot terminating with the bloom end, the method comprising:

providing a sheet of material having an upper surface, a lower surface and an outer perimeter, a sheet extension being connected to the outer perimeter of the sheet of material and the sheet extension extending a distance from the outer perimeter of the sheet of material;

forming the sheet of material into a pot cover having a top, a closed bottom and a cover opening extending through the top a distance toward the closed bottom of the pot cover providing a pot receiving space shaped and adapted to receive the pot, the pot cover having a plurality of overlapping folds, the pot cover having a base portion having an upper end and a skirt portion connected to the upper end of the base portion and extending a distance outwardly therefrom, the sheet extension forming an upper sleeve portion extending a distance outwardly from the skirt portion of the pot cover;

placing the pot in the pot cover with the bottom of the pot being disposed substantially adjacent the closed bottom of the pot cover and the floral grouping extending a distance upwardly from the top of the pot cover; and forming the upper sleeve portion about the floral grouping with the upper sleeve portion covering a substantial portion of the floral grouping including the bloom end of the floral grouping.

10. A covering for use with a pot having a floral grouping disposed therein, the pot having a top, a bottom and an outer peripheral surface, and the floral grouping having a stem end and a bloom end with the floral grouping extending a distance upwardly from the top of the pot terminating with the bloom end, the covering comprising:

a pot cover having a top, a closed bottom and a cover opening extending through the top a distance toward the closed bottom of the pot cover providing a pot receiving space shaped and adapted to recieve the pot, the pot cover having a plurality of overlapping folds, the pot cover having a base portion having an upper end and a skirt portion connected to the upper end of the base portion and an upper sleeve portion extending a distance outwardly from the skirt portion, the pot being disposed in the pot receiving space with the bottom of the pot being disposed adjacent the closed bottom of the pot cover and the top of the pot being disposed near the top of the pot cover, the upper sleeve portion being formed about the floral grouping with the upper sleeve portion covering a substantial portion of the floral grouping including the bloom end of the floral grouping.

11. A method of providing a cover comprising:

providing a pot having a floral grouping disposed therein, the pot having a top a bottom and an outer peripheral surface, and the floral grouping having a stem end and a bloom end with the floral grouping extending a distance upwardly from the top of the pot terminating with the bloom end;

providing a sheet of material having an upper surface, a lower surface and an outer perimeter, a sheet extension being connected to the outer perimeter of the sheet of material and the sheet extension extending a distance from the outer perimeter of the sheet of material, the outer perimeter of the sheet of material being defined by perforations such that the sheet extension is removable from the sheet of material;

forming the sheet of material into a pot cover having a top, a closed bottom and a cover opening extending through the top a distance toward the closed bottom of the pot cover providing a pot receiving space shaped and adapted to receive the pot, the pot cover having a plurality of overlapping folds, the pot cover also having a base portion with an upper end and a skirt portion connected to the upper end of the base portion and extending a distance outwardly therefrom, the sheet extension forming an upper sleeve portion extending a distance from the skirt portion of the pot cover;

placing the pot in the pot cover with the bottom of the pot being disposed substantially adjacent the closed bottom of the pot cover and the floral grouping extending a distance upwardly from the top of the pot cover;

forming the upper sleeve portion about the floral grouping with the upper sleeve portion covering a substantial portion of the floral grouping including the bloom end of the floral grouping; and removing the upper sleeve portion from the pot cover by tearing along the perforations, thereby providing a decorative cover for the pot.

12. The method of claim 11 wherein, in the step of providing the sheet of material with the sheet extension connected thereto, the sheet extension is provided with a bonding material disposed thereon, and wherein, in the step of forming the upper sleeve portion about the floral grouping, the bonding material connects at least a portion of the upper sleeve portion to provide a closed end of the upper sleeve portion of the pot cover with the closed end being disposed above the bloom end of the floral grouping.

* * * * *